United States Patent
Blanco et al.

(10) Patent No.: US 9,268,807 B2
(45) Date of Patent: Feb. 23, 2016

(54) IN-MEMORY BITMAP FOR COLUMN STORE OPERATIONS

(71) Applicants: Rolando Blanco, Waterloo (CA); Anil Kumar Goel, Waterloo (CA); Mihnea Andrei, Issy les Moulineaux (FR)

(72) Inventors: Rolando Blanco, Waterloo (CA); Anil Kumar Goel, Waterloo (CA); Mihnea Andrei, Issy les Moulineaux (FR)

(73) Assignee: Sybase, Inc., Dublin, CA (US)

( * ) Notice: Subject to any disclaimer, the term of this patent is extended or adjusted under 35 U.S.C. 154(b) by 167 days.

(21) Appl. No.: 13/944,196

(22) Filed: Jul. 17, 2013

(65) Prior Publication Data

US 2015/0026141 A1    Jan. 22, 2015

(51) Int. Cl.
*G06F 17/30* (2006.01)

(52) U.S. Cl.
CPC .... *G06F 17/30324* (2013.01); *G06F 17/30315* (2013.01); *G06F 17/30067* (2013.01); *G06F 17/30321* (2013.01); *G06F 17/30563* (2013.01); *G06F 17/30961* (2013.01)

(58) Field of Classification Search
CPC ............... G06F 17/30321; G06F 17/30067; G06F 17/30961; G06F 17/30324; G06F 12/023
USPC ......... 707/823, 745, 718, 609, 790, 803, 714, 707/713, 736, 602, 769, 600, 693, 802, 793, 707/796, 824; 711/156, 202; 709/217
See application file for complete search history.

(56) References Cited

U.S. PATENT DOCUMENTS

| | | | |
|---|---|---|---|
| 5,864,342 A * | 1/1999 | Kajiya et al. .................. 345/418 |
| 5,873,127 A * | 2/1999 | Harvey et al. ................. 711/206 |
| 6,081,800 A * | 6/2000 | Ozbutun et al. |
| 6,182,089 B1 * | 1/2001 | Ganapathy et al. |
| 6,182,689 B1 * | 2/2001 | Lauer et al. .................... 137/550 |
| 6,285,994 B1 * | 9/2001 | Bui et al. ....................... 707/745 |
| 6,621,935 B1 * | 9/2003 | Xin et al. ....................... 382/253 |
| 6,690,491 B1 * | 2/2004 | Kondo .......................... 358/3.01 |
| 7,373,366 B1 * | 5/2008 | Chatterjee et al. |
| 7,453,377 B2 * | 11/2008 | Lee et al. ........................ 341/51 |
| 7,634,457 B2 * | 12/2009 | Lawande .......... G06F 17/30501 |
| 7,836,107 B2 * | 11/2010 | Gandhi et al. ................. 707/823 |
| 8,099,440 B2 * | 1/2012 | Johnson ............ G06F 17/30315 707/802 |
| 8,179,558 B2 * | 5/2012 | Yamazaki ..................... 358/1.18 |
| 8,583,838 B1 * | 11/2013 | Marshak et al. ................ 710/18 |
| 8,700,579 B2 * | 4/2014 | Apanowicz ....... G06F 17/30448 707/693 |
| 8,719,529 B2 * | 5/2014 | Benhase et al. ................ 711/165 |
| 8,762,674 B2 * | 6/2014 | Benhase et al. ................ 711/165 |
| 8,806,154 B1 * | 8/2014 | Gupta et al. ................... 711/156 |
| 8,972,337 B1 * | 3/2015 | Gupta ............................ 707/602 |
| 2004/0153621 A1 * | 8/2004 | Polansky et al. .............. 711/202 |
| 2004/0181501 A1 * | 9/2004 | Burdick et al. .................... 707/1 |

(Continued)

FOREIGN PATENT DOCUMENTS

WO      WO 03102869 A2 * 12/2003
WO      WO 2007143882 A1 * 12/2007 ............. G06F 12/00

*Primary Examiner* — Frantz Coby
(74) *Attorney, Agent, or Firm* — Sterne, Kessler, Goldstein & Fox PLLC

(57) ABSTRACT

Disclosed herein are system, method, and computer program product embodiments for implementing a bitmap for a column store database. An embodiment operates by creating, by at least one processor, a bitmap identifying rows in a column store database. The bitmap may include a list of bit chunks, a bit chunk including an offset being a natural number indicating a chunk size, and a bit specification including one of an ordered row id list, a contiguous row id sequence, and a bit vector. In addition, the embodiment includes performing database operations using the bitmap.

20 Claims, 7 Drawing Sheets

(56) References Cited

U.S. PATENT DOCUMENTS

| | | | |
|---|---|---|---|
| 2011/0214078 A1* | 9/2011 | Klask et al. | 715/763 |
| 2012/0016952 A1* | 1/2012 | Watt | 709/217 |
| 2012/0259809 A1* | 10/2012 | Hermann et al. | 707/600 |
| 2012/0310934 A1* | 12/2012 | Peh et al. | 707/736 |
| 2013/0159285 A1* | 6/2013 | Dees et al. | 707/718 |
| 2013/0166531 A1* | 6/2013 | Valentin | 707/713 |
| 2013/0166535 A1* | 6/2013 | Valentin | 707/714 |
| 2013/0226959 A1* | 8/2013 | Dittrich et al. | 707/769 |
| 2013/0290665 A1* | 10/2013 | Heidel et al. | 711/171 |
| 2014/0032841 A1* | 1/2014 | Ahmad | 711/115 |
| 2014/0067819 A1* | 3/2014 | Novoselsky | G06F 17/30923 707/741 |
| 2014/0181154 A1* | 6/2014 | Amulu et al. | 707/803 |
| 2014/0214333 A1* | 7/2014 | Plattner et al. | 702/19 |
| 2014/0244690 A1* | 8/2014 | Vundavalli | 707/790 |
| 2014/0258212 A1* | 9/2014 | Kunert et al. | 707/607 |
| 2014/0258217 A1* | 9/2014 | Kemmler | 707/609 |
| 2015/0006809 A1* | 1/2015 | Harizopoulos et al. | 711/109 |

* cited by examiner

IN-MEMORY BITMAP FOR COLUMN STORE OPERATIONS

BACKGROUND

Commercial database systems rely on representations of data stored in the database in order to efficiently query the data. Column-store database systems may have tables with billions of rows. Current disk-based methods of querying these numerous rows may be inoperable or impractical for use with in-memory column store operations. In addition, conventional ways of representing data can be slow and memory expensive.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, method and/or computer program product embodiments, and/or combinations and subcombinations thereof, for utilizing an in-memory bitmap for column store operations.

Figure 1:
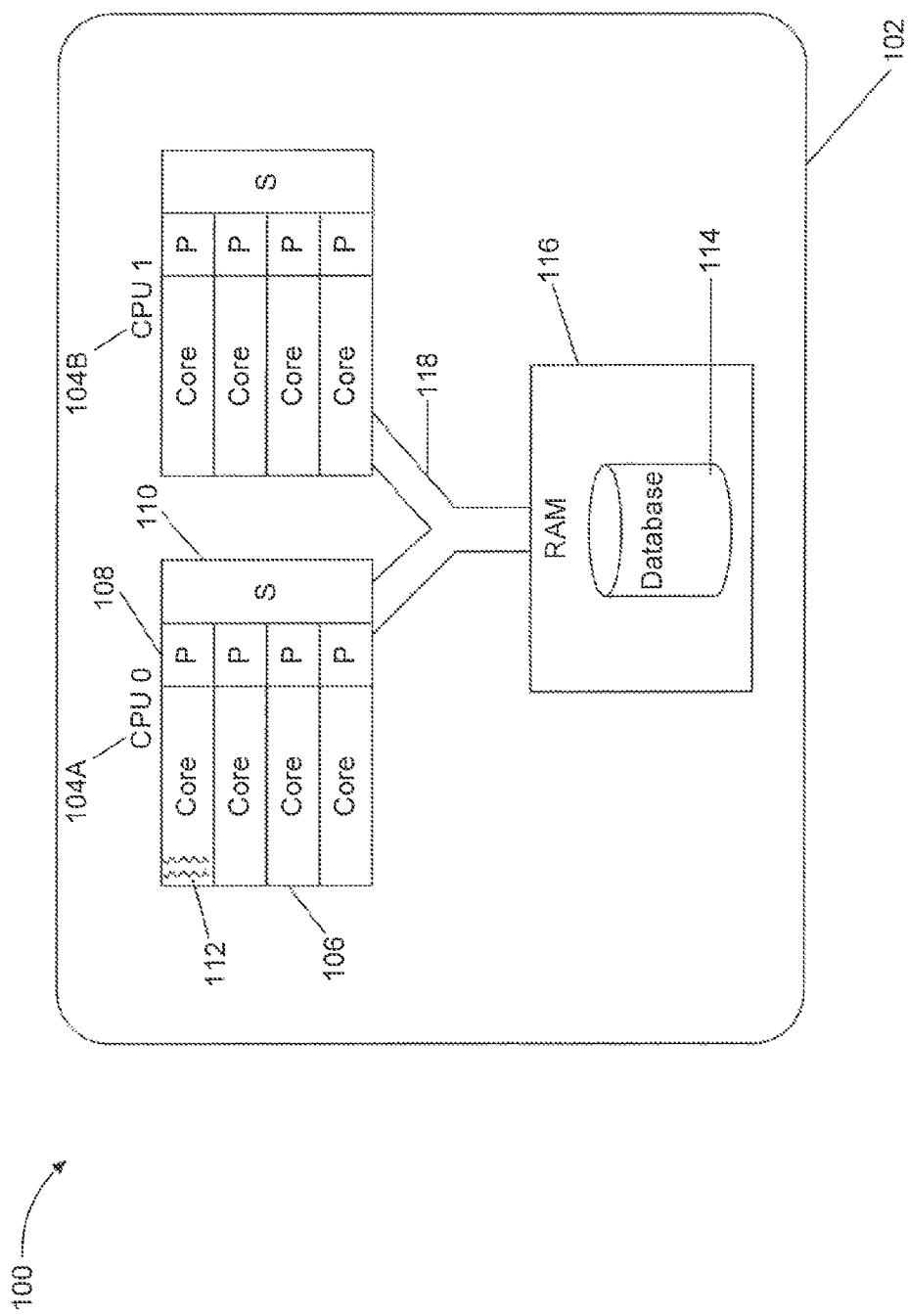
FIG. 1 is a block diagram of a database system, according to an example embodiment.

Commercial database systems rely on bitmaps to identify sets of rows. In columnar databases these bitmaps are created and used in particular ways that differ from traditional row-oriented databases. By identifying these particular bitmap uses in columnar databases and optimizing the implementation of the bitmaps for these uses the performance of the columnar database, both in terms of memory and processing requirements, can be improved when compared to columnar databases using conventional bitmap implementations.
Example Block Diagram of Database Architecture FIG. 1 shows a block diagram of a database system 100 according to an example embodiment. The database system 100 may be, but is not limited to, an in-memory database system. As shown in FIG. 1, database system 100 may include a computer 102 having at least one processor 104. As an example, the database system 100 in FIG. 1 is shown having two processors, but the database system is not limited to having two processors and may have a single processor or more than two processors. Each processor 104 may include a plurality of cores 106 each having a private cache 108. As an example, CPU 0 104A and CPU 1 104B in FIG. 1 are shown as having four cores 106 each, but the processors may include less than four cores or more than four cores. Each processor 104 may include caches 108 and cache 110 that is shared among its cores. Each core 106 may have a plurality of hardware contexts, e.g. threads 112. In addition, the computer 102 includes random-access memory (RAM) 110 which may include hundreds of GB or TBs of RAM (or more or less RAM). According to example embodiments, the database system 114 may be an in-memory column-store database system stored and executed within RAM 116. Thus, in an embodiment, as opposed to conventional database systems stored on disk where disk access and speed presents a bottleneck, the RAM 116 of an in-memory database system may present a bottleneck for the faster caches 108 and 110. The RAM 116 having the database system 114 and processors 104 may communicate via a bus 118.

According to an example embodiment, the database system 114 includes an in-memory bitmap that is optimized for column store operations. In an embodiment, a column store is a database system where data is stored by grouping values by column instead of by row. For example, a table Players (FirstName, LastName, Position) may include rows (1) (Alan, Shearer, Forward), (2) (Rafael, Marques, Center Back), and (3) (Fabien, Barthez, Goalkeeper). In a column store, these rows are stored as (Alan, Rafael, Fabien) for the FirstName column, (Shearer, Marquez, Barthez) for the LastName column, and (Forward, Center Back, Goalkeeper) for the Position column. In addition, an append-only column store is a column store where each update of a row is implemented as a deletion of the row with the old values followed by an insert of the row with the updated values. As an example, when updating Rafael Marquez's last name with the proper spelling:

Update Players set LastName Márquez where LastName=Marquez

The resulting rows are stored as:

(Alan, ~~Rafael~~, Fabien, Rafael), (Shearer, ~~Marquez~~, Barthez, Márquez), and (Forward, ~~Center Back~~, Goalkeeper, Center Back)

~~Rafael~~, ~~Marquez~~, and ~~Center Back~~ represent deleted rows.

Bitmaps may be used to represent set membership. Assuming that a set B of values includes 0 to N, a bitmap BM for a subset of B of A represents a function BM: A→{0, 1} such that for an element e of A, BM(e) is 1 if e is in B, and 0 if e is in (B-A). As a non-limiting example, it is possible to identify each row in the Players table by numerical position in the table (e.g., 1 for Alan Shearer, 3 for Fabien Barthez and 4 for Rafael Márquez). In addition a bitmap, Goalkeeper, can be used to represent which players are goalkeepers. As Fabien Barthez is the only player in the Players table that is a goalkeeper, then Goalkeeper(1)=0, Goalkeeper(3)=0, and Goalkeeper(4)=1. In this example A={1, 3, 4} and B={4}.

A numerical position of a row in a table is known as its rowid or rid. According to an example embodiment, bitmaps are used to represent which rids belong to a set. Throughout this document the terms rid and bit may be used interchangeably.

According to a non-limiting embodiment, bitmaps may be used in column stores (1) to indicate the rows of a table that are visible to a particular transaction, (2) to indicate which rows a transaction has inserted or deleted, and (3) when querying the database to indicate rows that meet a certain condition (e.g., Position=Goalkeeper). In other words, a bitmap may be used when a set of rows needs to be identified.

When constructing a bitmap, rids in the set that the bitmap is representing may be specified that are members of the set that the bitmap is representing. Thus, (1) rids may be specified one by one in an operation called SetBit which receives a single argument, one rid, that belongs to a set, (2) rids may be specified in a range of rids using SetBits which receives a first argument of a first rid in the range and a second argument which is a number of rids in the range, (3) rids may be removed from a bitmap using operations including UnsetBit and UnsetBits which are similar to SetBit and SetBits, but perform opposite functions, and (4) a bitmap may be constructed as a result of logical operations (e.g., And, Or, XOr) between bitmaps. As an example, a bitmap resulting from the Or of two bitmaps may include the union of all rids in each one of the Ored bitmaps. The bitmap resulting from an And of two bitmaps includes the intersection of the Anded bitmaps.

A TestBit operation may be used to decide if a given rid belongs to a set represented by a bitmap. A rid r is in a bitmap if TestBit(r) returns True, otherwise r is not in the BM.

According to an example embodiment, in column stores, bitmaps may be constructed by invoking SetBit and SetBits where a rid or rids being added to a bitmap are greater than all rids currently in the bitmap. In other words, rids which are specified in SetBit or SetBits may be appended to the bitmap. When SetBit or SetBits is used to append bits, this is known as AppendBit or AppendBits, which is described further below.

According to further example embodiments, a bitmap may be used to indicate rows according to the following. A bitmap used to indicate rows inserted by a transaction may be populated by appending rids. A bitmap used to indicate rows belonging to a partial result of a query may be populated by appending rids to the bitmap as data in a column on which a condition is specified is sequentially scanned. A bitmap used to indicate rows belonging to a partial result of a query is constructed as a result of logical operations between bitmaps representing partial query results. A bitmap used to indicate rows belonging to a total result of a query is either a bitmap populated by appending rids as the column store is scanned if the query has only one condition on the column or by logical operations between bitmaps representing partial query results. A bitmap used to indicate rows deleted by a delete statement is the bitmap identifying the rows that meet the condition in the query part of the delete statement. A bitmap is used to determinate the rows visible to a transaction (e.g., the rows specific to a version of a table). When establishing a new table version, the bitmap identifying rows specific to the new table version is constructed by or-ing bitmaps representing the rows visible to the current latest version and the bitmaps representing the rows inserted into and deleted from the table by the transaction committing and establishing the new table version. Separate bitmaps may be kept for inserted and deleted rows. When or-ing the insert bitmaps to establish a new table version, the rows identified in the bitmaps or-ed are disjoint. Frequently, all rows identified in one bitmap are after all the rows identified in the other bitmap.

According to an example embodiment, implementation of a bitmap is based on a tradeoff between an amount of memory required to represent the bitmap and a speed with which the bitmap may be constructed and queried. Conventionally, bitmaps are implemented as vectors of bits. With this vector-based representation, operations on bitmaps may be executed by determining a position of a bit in the bitmap. However, bitmaps require a large amount of memory when a table is large. Because tables may have billions of rows, use of bit vectors is generally memory expensive.

According to example embodiments, a bitmap is developed for use with a column store. The bitmap is an in-memory bitmap and according to example embodiments, exhibits better processing time for appending bits, setting bits, and logical operations while requiring affordably more space than other implementations. The bitmap may include a bit specification including one of a ridlist, a contseq, or a bitvect, each of which are described further herein.

Ridlist

According to an example embodiment, a ridlist is an ordered list of rids, for example, 3, 8, 12. A range of a ridlist includes an interval of numbers between a first and a last number in the ridlist, e.g., 3 to 12.

Contseq

A contiguous rid sequence or a contseq is a sequence of rids, e.g., 3, 4, 5, 6, which may be represented as [3; 6]. According to example embodiments, 3, 5, 6 is not a contseq.

Bitvect

A bit vector or a bitvect is an array of bits. Bit vectors may be used to represent set membership.

Bit Chunk

Bitmaps may be represented as lists of bit chunks. For each rid in a range of rids, a bit chunk or chunk may determine a state of the rid. In other words, the chunk may provide whether a rid is in a set that is represented by the bitmap. Each chunk may be represented by a pair including (offset, bit specification) where offset is a natural number and bit specification is one of a ridlist, a contseq, and a bitvect.

Chunk Ranges and Offset Alignment

Chunks having one of a ridlist and bitvect bit specification determine a state of a same number of rids DefChunkSize, where DefChunkSize is divisible by a number of bits in a machine word (e.g., 64 in current CPUs). Each chunk having a contseq bit specification may determine a state of a multiple of DefChunkSize rids.

For each chunk, offset is divisible by DefChunkSize. As a result, for a ridlist or a bitvect bit specification, a range of the chunk (e.g., rids for which the chunk provides rid state) is offset from offset to (offset+DefChunkSize−1). Further, for a contseq bit specification, from $[e_1; e_n]$, the range of the chunk is offset to (Floor ((offset+$e_n$)/DefChunkSize)*DefChunkSize+DefChunkSize−1). As an example, for a chunk (64, [1; 1000]), the chunk provides a state of the rids for 64 to 1087. A chunk which has a range which is larger than DefChunkSize is known as an extended contseq chunk.

Thus, for each chunk, a rid r within a chunk's range is in a chunk, e.g., the chunk includes r if and only if (1) the chunk's bit specification is a ridlist $[e_1, e_2 \ldots]$ and r=offset+$e_1$ or r=offset+$e_2$ (2) the chunk's bit specification is a bitvect $[b_0, b_{n-1}]$ and bit $b_i$ is ON with r=i+offset or (3) the chunk's bit specification is a contiguous sequence $[e_1; e_n]$ and (offset+$e_1$) is less than or equal to (offset+$e_n$), and r is greater than or equal to offset+$e_1$ and less than offset+$e_n$ . . . As an example, for a chunk (64, [1; 1000]), rids 65 through 1064 are in the chunk.

As further discussed herein, ridlist, contseq, and bitvect refer to a chunk having a bit specification being a rid list, a contiguous rid sequence, and bit vector specification, respectively.

Well Formed Bitmaps

According to an example embodiment, the state of each rid may not be determined by more than one chunk (e.g., all chunks in each bitmap are disjoint). In addition, if a chunk C occurs in a bitmap before $C_k$, then a first rid in $C_i$'s range is before the first rid represented in $C_k$'s range (e.g., the list of chunks in each bitmap is sorted by chunk range). Further, each chunk includes at least one rid (e.g., no bitmap has an empty chunk). Thus, r is said to be in bitmap BM if and only if there is a chunk C in BM such that r is in the chunk.

Bitmap Implementation

Each chunk may include an encoding field that specifies a type of chunk and an offset field that is implemented as a 64-bit unsigned integer. FirstRid and LastRid fields may represent a first and a last rid in the chunk. Contseq chunks do not require any further fields. For each ridlist chunk, an array of 64-bit unsigned integer rids may be maintained with a fixed configurable capacity. Rids within the ridlist are sorted. Bitvect chunks may include a bit vector, implemented as an array of (DefChunkSize/MachineWordSize) words. in each chunk type, pointers are used to point to a next and a previous chunk. Further, each bitmap includes two fields, FirstChunk and LastChunk which are used to point to a first and a last chunk in a list of chunks. As a non-limiting example, assuming a DefChunkSize of 64 and a ridlist capacity of 6 rids, a bitmap with rids 1, 2, . . . , 1024, 1025, 1032, 2049, 2051, 2053, 2055, 2057, 2059, 2061 may be represented as shown in FIG. 2.

Figure 2A:
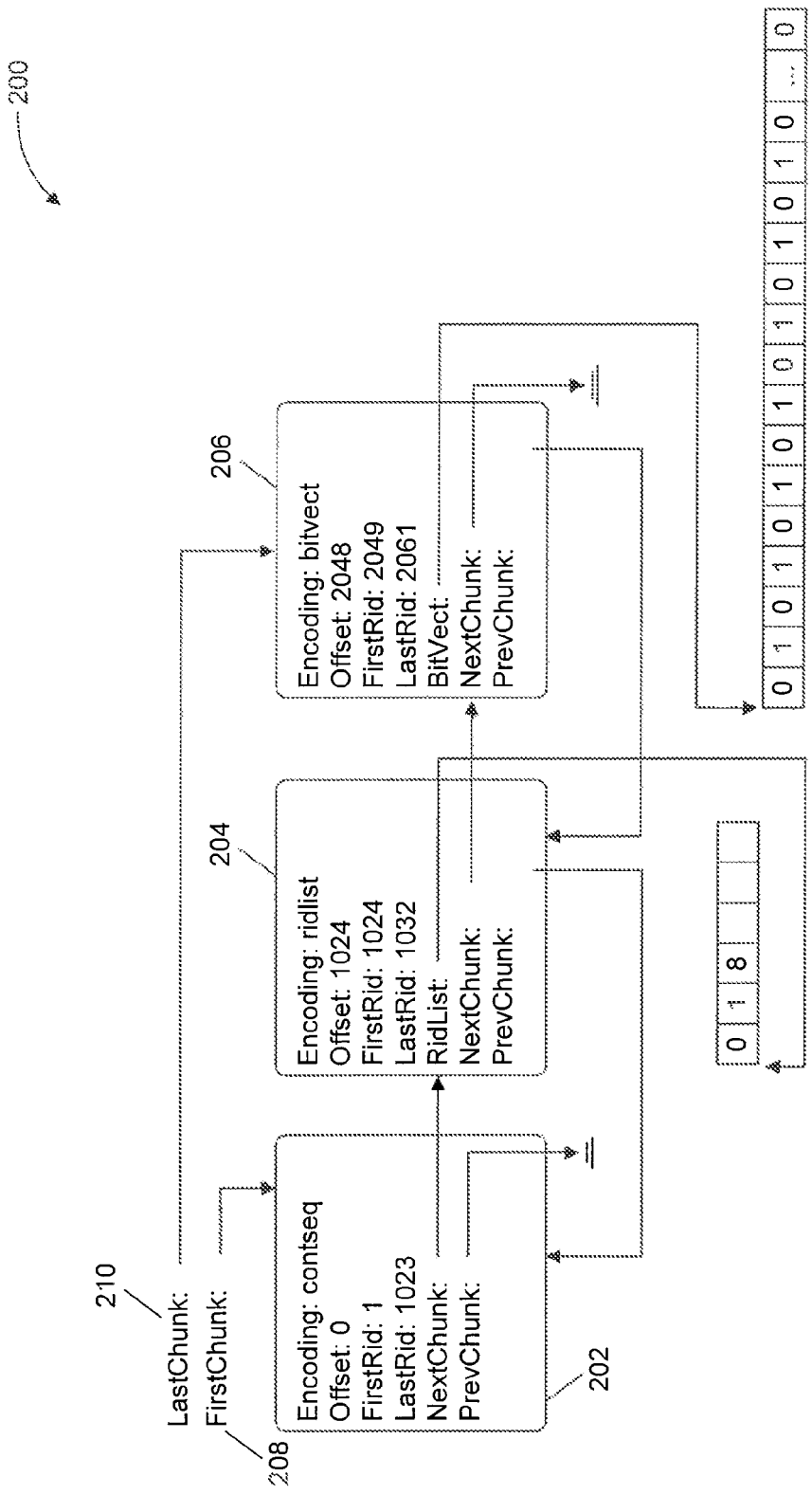
FIG. 2A illustrates a representation of a bitmap, according to an example embodiment.

FIG. 2A illustrates representation of a sample bitmap 200. Bitmap 200 is represented by three chunks 202, 204, and 206. The FirstChunk pointer 208 points to chunk 202 and the LastChunk pointer 210 points to chunk 206. The chunks 202, 204, and 206 in bitmap 200 are described below.

The first chunk 202 is an extended contseq chunk having a rid range of 0 to 1023 and rids 1 to 1023 (e.g., rid 0 is the only rid in the range not in the chunk). The second chunk 204 is a ridlist chunk with rid range 1024 to 1087 and rids 1024+0, 1024+1, and 1024+8. As shown in FIG. 2, the ridlist may store 6 rids. The third chunk 206 is a bitvect chunk with a rid range of 2048 to 2111 and rids 2049, 2051, 2053, 2055, 2057, 2059, and 2061. As shown in FIG. 2, because DefChunkSize is 64 bits, the bitvect chunk has a bit vector of size of one 64 bit word, Thus, bits 1, 3, 5, 7, 9, 11, and 13 are set in the bit vector. Hence, 2049=2048+1, 2051=2048+3, 2053=2048+5, etc. The bitmap does not have rids in ranges 1088-1151, 1152-1215, . . . 1984-2047 and thus there are no chunks in the bitmap which correspond to these ranges.

Figure 2B:
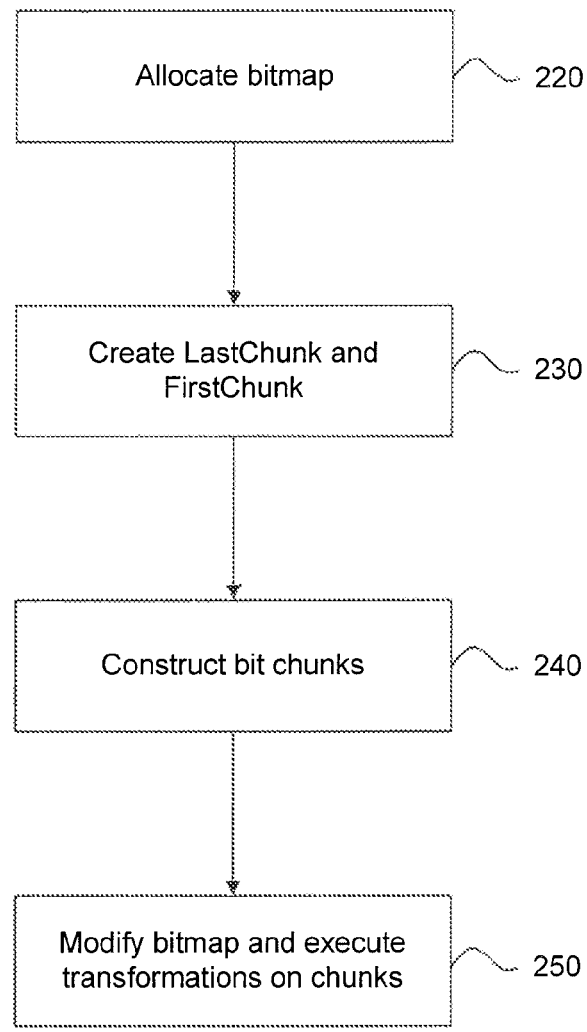
FIG. 2B illustrates implementation of a bitmap, according to an example embodiment.

FIG. 2B illustrates implementation of a bitmap such as bitmap 200 shown in FIG. 2A. In step 220, a bitmap may be allocated in memory to identify a number of rows of a table in a database organized as an in-memory column store, the bitmap being a list of bit chunks, e.g. 202, 204 and 206. In step 230, a FirstChunk 208 and a LastChunk field may be created to store a reference to a last chunk in the bitmap and a first chunk in the bitmap. When the bitmap 200 is created and is empty, both FirstChunk 208 and LastChunk 210 may initially point to NULL. In step 240, the chunks of the bitmap may be constructed, wherein each chunk stores at least one rid. As noted above, each chunk constructed in step 240 may be represented by a pair including (offset, bit specification) where offset is a natural number and bit specification is one of a ridlist, a contseq, and a bitvect. Each chunk constructed in step 240 may also include a field which stores a reference to a next chunk and a previous chunk, each of which may be null. In step 250, the bitmap may be modified and chunks within the bitmap may be transformed between different types of bit specifications as rids are added and removed from the bitmap. As bits are added to the bitmap, one or more chunks may be created, or a previously existing chunk may be modified, e.g., bit chunk representation may change, chunks may be split into multiple chunks, and chunks may be merged together. As the bitmap is modified and chunks are added and removed, FirstChunk 208 and LastChunk 210 may be updated accordingly to point to the first and last chunk in the bit nap. The modifications to the bitmap and associated transformations are discussed further herein, and are optimized for an in-memory columnar store.

Transformations

According to an example embodiment, rids may be added and removed from bitmaps. In some cases, rids must be added and removed, and in other cases it may be beneficial to add or remove rids, e.g., if a new chunk representation uses less memory than a previous representation. Therefore, chunk representation within each bitmap is dynamic, but care is to be taken in order to make transformation decisions quickly. if too much time is spent determining whether to transform a bitmap in order to minimize space required to represent the bitmap, then overall performance of the bitmap may suffer. Thus, according to an example embodiment, it is important to not spend too much time optimizing bitmap memory allocation and transforming chunk representation.

Figure 3:
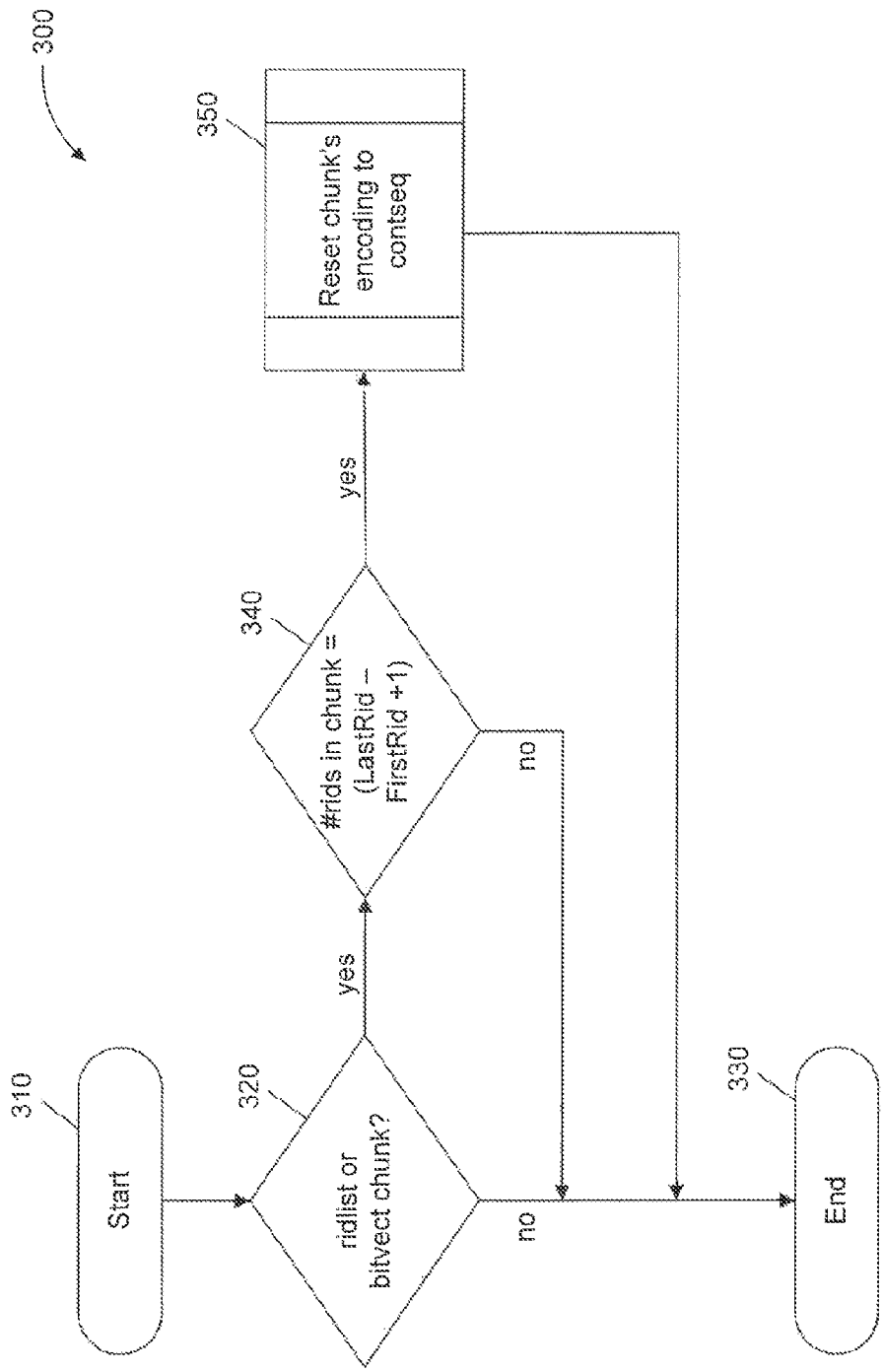
FIG. 3 is a flowchart illustrating TransformOnAdd, according to an example embodiment.
Figure 4:
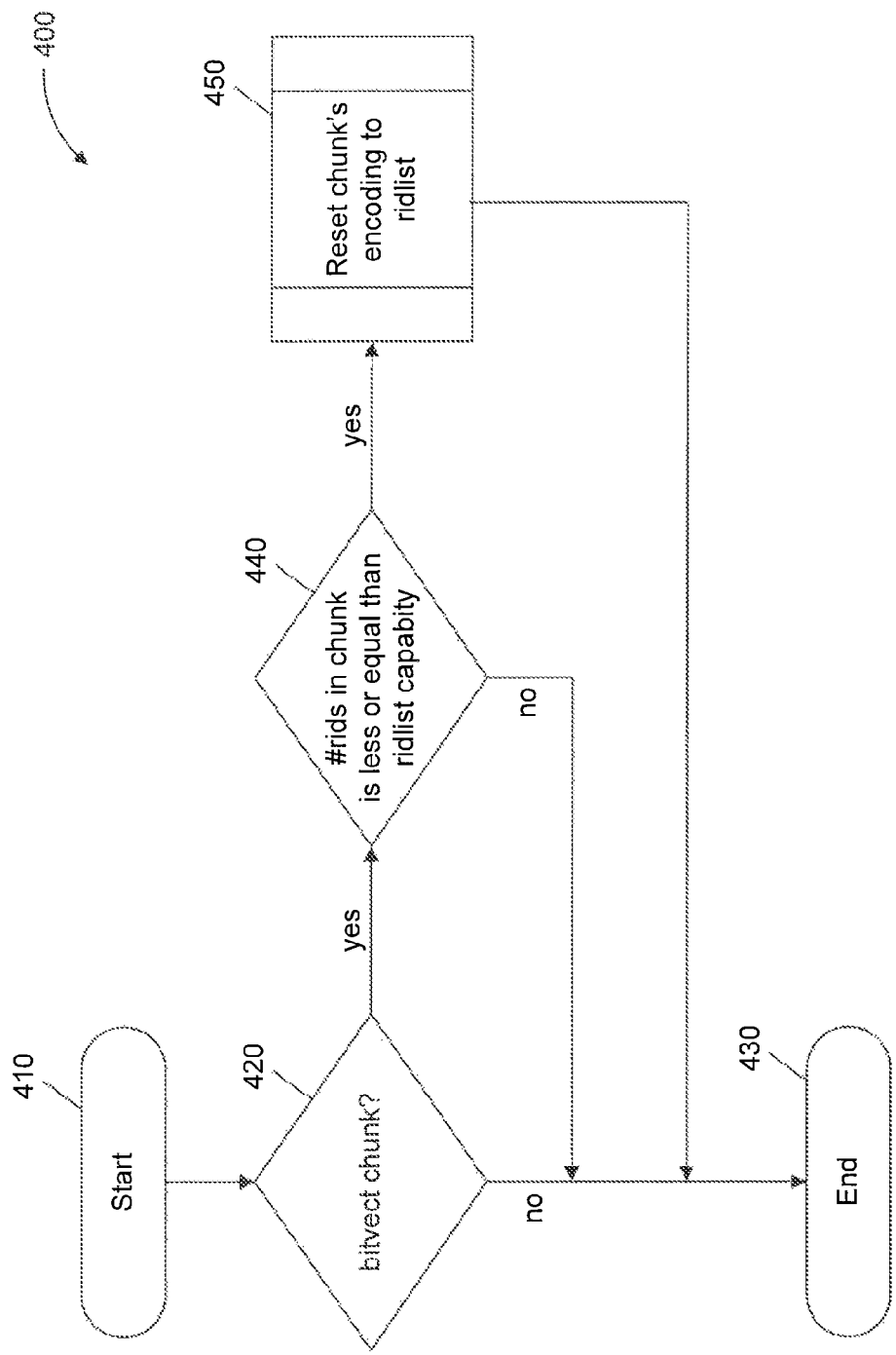
FIG. 4 is a flowchart illustrating TransformOnRemove, according to an example embodiment.

According to an example embodiment, transform operations may include TransformOnAdd shown in FIG. 3 and TransformOnRemove shown in FIG. 4. Both of these operations include an evaluation to determine whether to transform representation of a chunk. In TransformOnAdd, transformation decisions are made based on an assumption that more rowids will be added to a bitmap. In TransformOnRemove, transform decisions are made based on an assumption that rowids will be removed from a bitmap.

TransformOnAdd

FIG. 3 is a flowchart illustrating TransformOnAdd which is invoked when a chunk is represented as a ridlist or bitvect, and new rids are being added to the chunk as either the result of SetBit/SetBits operations or because of a logical operation such as Or or XOr. It is determined whether the bitvect or ridlist may be modified to be a contseq representation, which requires less memory than ridlist or bitvect. Reset chunk is used to deallocate a chunk's array of rids and reset the encoding field of the chunk to contseq.

TransformOnAdd is shown in FIG. 3 as 300. TransformOnAdd begins in step 310 and moves to step 320.

In step 320, it is determined whether a chunk is a ridlist or a bitvect chunk. If the chunk is determined to not be a ridlist or a bitvect chunk, then TransformOnAdd ends in step 330. However, if the chunk is a ridlist or a bitvect chunk, then TransformOnAdd moves to step 340.

In step 340, a number of rids in the chunk is determined. If the number of rids is equal to LastRid−FirstRid+1, then TransformOnAdd moves to step 350. If the number of rids does not equal LastRid−FirstRid+1, then the bit specification is not transformed and TransformOnAdd ends in step 330.

In step 350, the bit specification is transformed and chunk's encoding is reset to contseq. Then, TransformOnAdd ends in step 330.

TransformOnRemove

FIG. 4 is a flowchart illustrating TransformOnRemove which is invoked when unsetting rids, either as a result of UnsetBit/UnsetBits or logical operations And, Minus, or XOr. TransformOnRemove is invoked for bitvect chunks only with the goal to change representation to a ridlist if a number of bits set in the bitvect is less than the capacity of a ridlist. Thus, according to TransformOnRemove, the chunk's encoding is reset to ridlist by allocating a rid array, copying each rid in the original bitvect chunk, deallocating the chunk's vector of bits, and changing the encoding field to ridlist.

TransformOnRemove is shown in FIG. 4 as 400. TransformOnRemove begins in step 410 and moves to step 420.

In step 420, it is determined whether a chunk is a bitvect chunk. If the chunk is determined to not be a bitvect chunk, then the bit specification will not be transformed and TransformOnRemove ends in step 430. However, if the chunk is a bitvect chunk, then TransformOnRemove moves to step 440.

In step 440, a number of rids in the chunk is determined. If the number of rids is determined to be less than or equal to ridlist capacity, then TransformOnRemove moves to step 450. If the number of rids is not less than or equal to ridlist capacity, then the bit specification is not transformed and TransformOnRemove ends in step 430.

In step 450, the bit specification is transformed and chunk's encoding is reset to ridlist. Then, TransformOnRemove ends in step 430.

Thus, according to an example embodiment, a type of chunk (e.g., chunk encoding), may be changed under certain, circumstances and situations. As an example, when a capacity of a ridlist is exceeded, and rids in the ridlist are contiguous, a chunk may be reencoded into a contseq without adding rids to the chunk. The rids are added by invoking TransformOnAdd 300. As another example, if there is a contseq, rids may be removed from the middle of the contseq. In this case, if the chunk has a range of DefChunkSize, the chunk may be reencoded to be a ridlist or even a bitvect.

According to an example embodiment, when a chunk becomes a contseq chunk, it may be determined whether the chunk can be coalesced with a previous chunk or a next chunk. In other words, coalescing comprises replacing two chunks with a single chunk. Coalescing may be executed for contseq chunks and requires a resulting chunk to also be a contseq chunk. Coalescing chunks allows a dense bitmap to be more easily represented, e.g., use less memory for its representation, where a dense bitmap comprises a bitmap where most of its bits are set. As an example, a bitmap with a DefChunkSize of 64 having chunks including (0, [0; 63]) and (64, [0; 63]) may be represented with a single extended contseq chunk (0, [0; 127]).

Furthermore, according to an example embodiment, large bitmaps may be represented using a same amount of memory as a small bitmap. For example, a first bitmap may include rids 1 to 10 which are represented with a single contseq chunk (0, [1; 10]). A second bitmap may include rids 1 to 1,000,000,000 and be represented with a single contseq chunk (0, [1; 1000000000]), Both of these bitmaps may be represented using a same amount of memory.

As chunks are coalesced as bits are added, an extended contseq chunk (e.g., a chunk having a size greater than DefChunkSize) may need to be split into multiple chunks if rids are removed. As an example, a split of a chunk resulting from UnsetBit or UnsetBits may provide: (1) No chunks if all rids are removed, (2) One chunk if rids removed are at chunk boundaries, (3) Two chunks if rids removed were at the DefChunkSize boundary, or (4) Three chunks if rids removed are not at the chunk or DefChunkSize boundaries.

An extended chunk may have a size of 4*DefChunkSize. If the rid that is removed is DefChunkSize, the chunk may be split into an initial contseq chunk (0, [0; DefChunkSize−1]) and a chunk being (DefChunkSize, [1; (*DefChunkSize)−1]). If instead the rid DefChunkSize+3 is removed, then the resulting chunks may be (0, [0; DefChunkSize−1]) and (DefChunkSize, [111011 . . . 1]) and (2*DefChunkSize, [0; (2 DefChunkSize)−1]), the second chunk being a bitvect chunk.

Append Bit Optimizations

AppendBit and AppendBits operations occur frequently in append only column stores and according to example embodiments, bitmaps are optimized for these operations. When rids are added to an empty bitmap, the bitmap begins as a contseq chunk. When appending bits, if a last chunk in the bitmap is a contseq chunk and the bits to append immediately follow a last rid in the chunk, a LastRid field is incremented in the last contseq chunk. Thus, appending 1 bit or n bits is constant in execution time as well as constant in required memory. The AppendBits operation is efficient in terms in memory as well as processing requirements because no memory allocation is required, no addressing of words and bits in a bit vector is required, and no de-compression or re-compression of the bitmap is required.

When rids to append do not fit into a single chunk, the SetBits operation is invoked as discussed below. If rids to append fit into a single chunk, and rids are not covered by a last chunk, then a new contseq chunk is created to become the last chunk in the list. If rids are covered by a last chunk's range, then the last chunk may be an extended contseq chunk. The chunk may then be split into two chunks, the second chunk receiving the rids to append. However, if the last chunk is not an extended chunk, then the rids may be appended.

Figure 5:
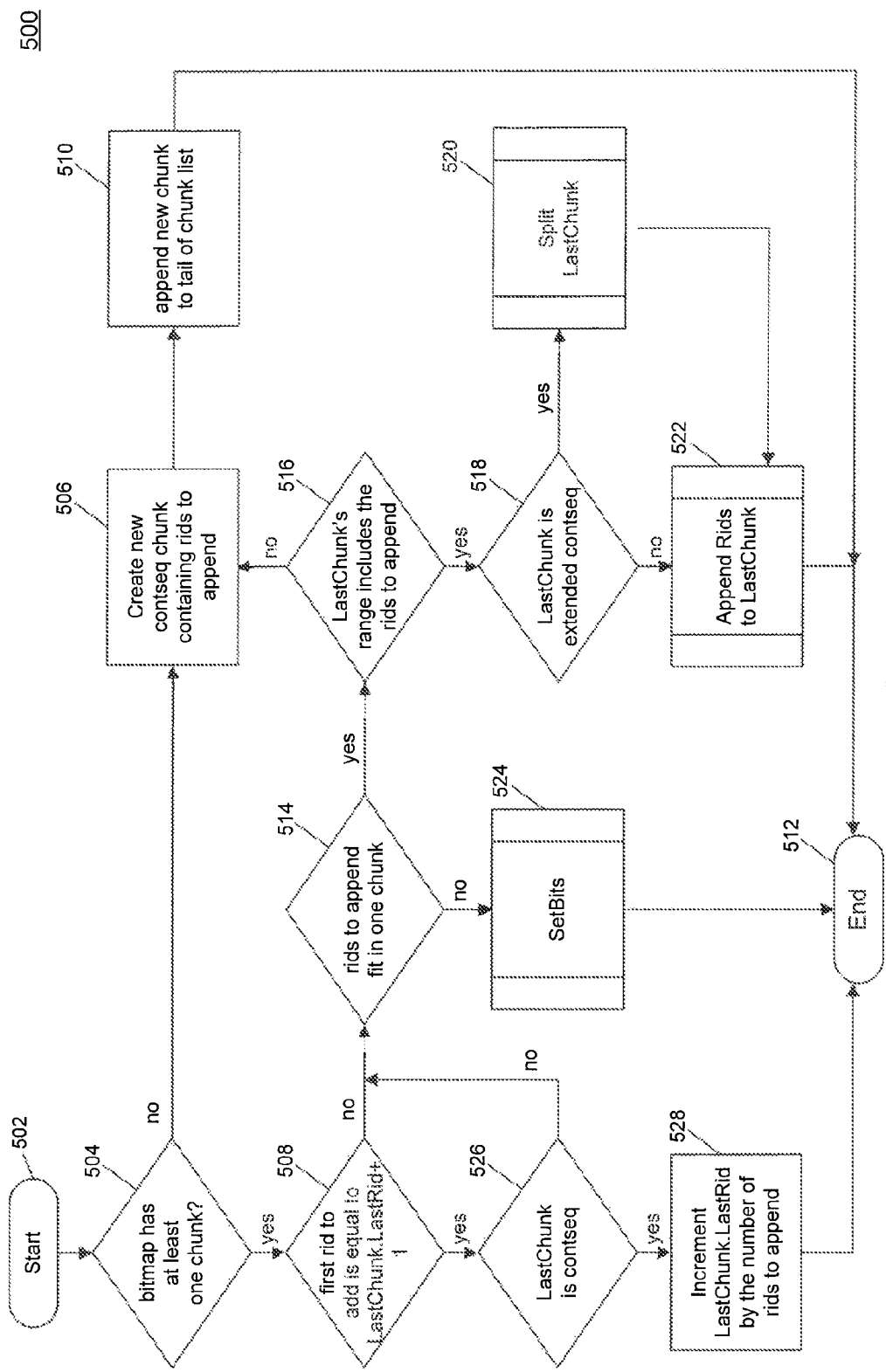
FIG. 5 is a flowchart illustrating AppendBits, according to an example embodiment.

AppendBits is shown in FIG. 5 as 500. The AppendBits process begins in step 502 and moves to step 504.

In step 504, it is determined whether the bitmap has at least one chunk. If it is determined that the bitmap does not have at least one chunk, then the process moves to step 506. However, if the bitmap is determined to have at least one chunk, then the process moves to step 508.

In step 506, a new contseq chunk is created which includes rids to append. In step 510, the new chunk is appended to the tail, of a chunk list. In step 512, after the new chunk is created and appended, the AppendBits process ends.

In step 508, after it is determined that the bitmap has at least one chunk, then it is determined whether a first rid to add is equal to LastChunk.LastRid+1. If the first rid to add is not equal to LastChunk.LastRid.+1, then in step 514 it is determined that rids to append will fit into one chunk.

In step 516, it is determined whether LastChunk's range includes rids to append. If LastChunk's range does not include the rids to append, then in step 510, the new chunk is appended to the tail of a chunk list. In step 512, after the new chunk is created and appended, the AppendBits process ends.

However, if it is determined that LastChunk's range does include the rids to append, the process moves to step 518. In step 518, it is determined whether LastChunk is an extended contseq. If LastChunk is an extended contseq, then in step 520, LastChunk is split. Next, in step 522, rids are appended to LastChunk. However, if in step 518 it is determined that LastChunk is not an extended contseq, then rids are appended to LastChunk in step 522. Then, in step 512, the process ends.

If it is determined that the rids to append will not fit in one chunk in step 514, then in step 524, SetBits is executed. Then, in step 512, the process ends.

In step 508, after it is determined that the bitmap has at least one chunk, then it may be determined that the first rid to add is equal to LastChunk.LastRid+1. In that case, the process moves to step 526 and in step 526 it is determined whether LastChunk is a contseq. If LastChunk is determined to be a contseq, then in step 528, LastChunk.LastRid is incremented by a number of bits to append. Then, in step 512, the process ends.

However, if in step 526 it is determined that LastChunk is not a contseq, then the process moves to step 514 and proceeds as described herein.

Thus, according to example embodiments, AppendBits proceeds according to the following:

a. If appending to a bitvect chunk, bits are set corresponding to rids to insert and operation TransformOnAdd is invoked.

b. If appending to a ridlist
  i. If rids in the chunk and the rids to insert form a contiguous rid sequence, the chunk is converted into a contseq chunk including rids in the array plus rids to insert.
  ii. If rid array capacity is exceeded, the chunk is reencoded as a bitvect chunk, otherwise the rids are added to the rid array.

c. If appending to a contseq and rids to insert do not immediately follow after a current last rid, the chunk is converted into either a ridlist or a bitvect and rids are added to the chunk. Otherwise, the LastRid field of the contseq chunk is adjusted to include new rids.

Therefore, when operations SetBit and SetBits are invoked rather than AppendBit or AppendBits, it is determined whether SetBit or SetBits can be transformed to AppendBit or AppendBits, and if this is possible, then AppendBit or AppendBits is invoked instead. This is possible if the rids being added are to be added to the end of the bitmap. SetBits is used to insert a contiguous range of rids into a bitmap.

SetBits begins by identifying whether rids to insert are greater than a current LastRid in the list. If the rids are greater than a current LastRid, then AppendBits is invoked instead and SetBits terminates.

However, if the bits to insert come after LastRid, a first chunk is located which has a first rid being smaller or equal than a first rid to insert. While identifying this chunk, chunks which are completely covered by a contiguous sequence of rids to be inserted will be removed.

However, if there is not a chunk having a range prior to rids to insert, or a chunk is identified having an ending range which is less than a first rid to insert, then a new contseq chunk is created which includes all rids to insert. This new chunk is made first in the list and then SetBits terminates.

According to example embodiments, after identifying a chunk as many rids as possible are inserted. Thus, if the chunk identified is an extended chunk, the chunk is split into two chunks and as many rids as possible are inserted into each of the chunks. The two chunks will then be coalesced, if possible. Then, a next chunk will be identified, divided, and coalesced if possible. If there are no remaining chunks, remaining rids are inserted into a new contseq chunk that will become a last chunk in the list. This new contseq chunk will be coalesced if possible, with a previous chunk.

According to example embodiments, once all rids are added to a chunk, TransformOnAdd is performed. Thus, encoding of the chunk may change.

Bitmap Shifting

According to further embodiments, rids in a bitmap may be shifted by a given number of positions. Shifting of rids may be accomplished using addition or subtraction. As an example, a bitmap may include rids (1, 2, 3). If these rids are shifted by adding them by 64, the bitmap will become (65, 66, 67). Thus, each bit in the bitmap may be shifted one-by-one. If the shifting is found to be divisible by DefChunkSize, shifting may be accomplished by adjusting an offset in each chunk by adding or subtracting a shift amount from a chunk's offset.

SUMMARY

According to example embodiments, optimal configurations for list chunk parameters such as a maximum number of rids per ridlist chunk may be determined based on a DefChunkSize. In addition, bitmap implementation performance in terms of execution time and memory consumption outperform word-aligned hybrid run-length code (WAH), a conventional compression scheme used for implementing bitmaps.

Thus, as described herein, bitmaps comprise lists of bit chunks wherein each bit chunk determines a state of a predetermined range of bits. Each chunk may be encoded either as an array of bit numbers, as a bit vector, or as two numbers which represent a first and a last bit number in a contiguous sequence of bits. Chunks may be sorted within the bitmap based on bit ranges which they represent. According to example embodiments, a state of a bit is only determined by one chunk, and each chunk includes at least one bit (e.g., no empty chunks). Chunks including a bit list or a bit vector determine a state of DefSizeChunk bits, where DefSizeChunk is a configurable number that is divisible by a size of a machine word where the bitmap has been implemented (e.g., 64). Chunks with a contiguous sequence can represent a state of n*DefSizeChunk bits. Thus, a first bit for which a chunk determines state is a multiple of DefSizeChunk (e.g., the chunks are DefSizeChunk-aligned).

Bits which are within a chunk are represented relative to a beginning of the chunk, not to a beginning of a bitmap. Thus, an offset field may be kept for each chunk which determines an actual range of the chunk. All bits in the bitmap may be shifted plus or minus n*DefSizeChunk number of bits by incrementing or decrementing the offset in each chunk.

Bits may be appended to a bitmap by incrementing a field in a last chunk of the list if the last chunk is encoded as a contiguous sequence of bits, and the bits to append follow immediately after a last bit currently in the chunk. For all other cases, at most two chunks are affected when bits are appended. Types of chunks in a bitmap and a number of chunks may change dynamically as bits are added or removed from the bitmap. As provided herein, logical operations between two bitmaps are implemented by iterating over chunks and applying logical operations at the chunk level.

Example Computer System

Figure 6:
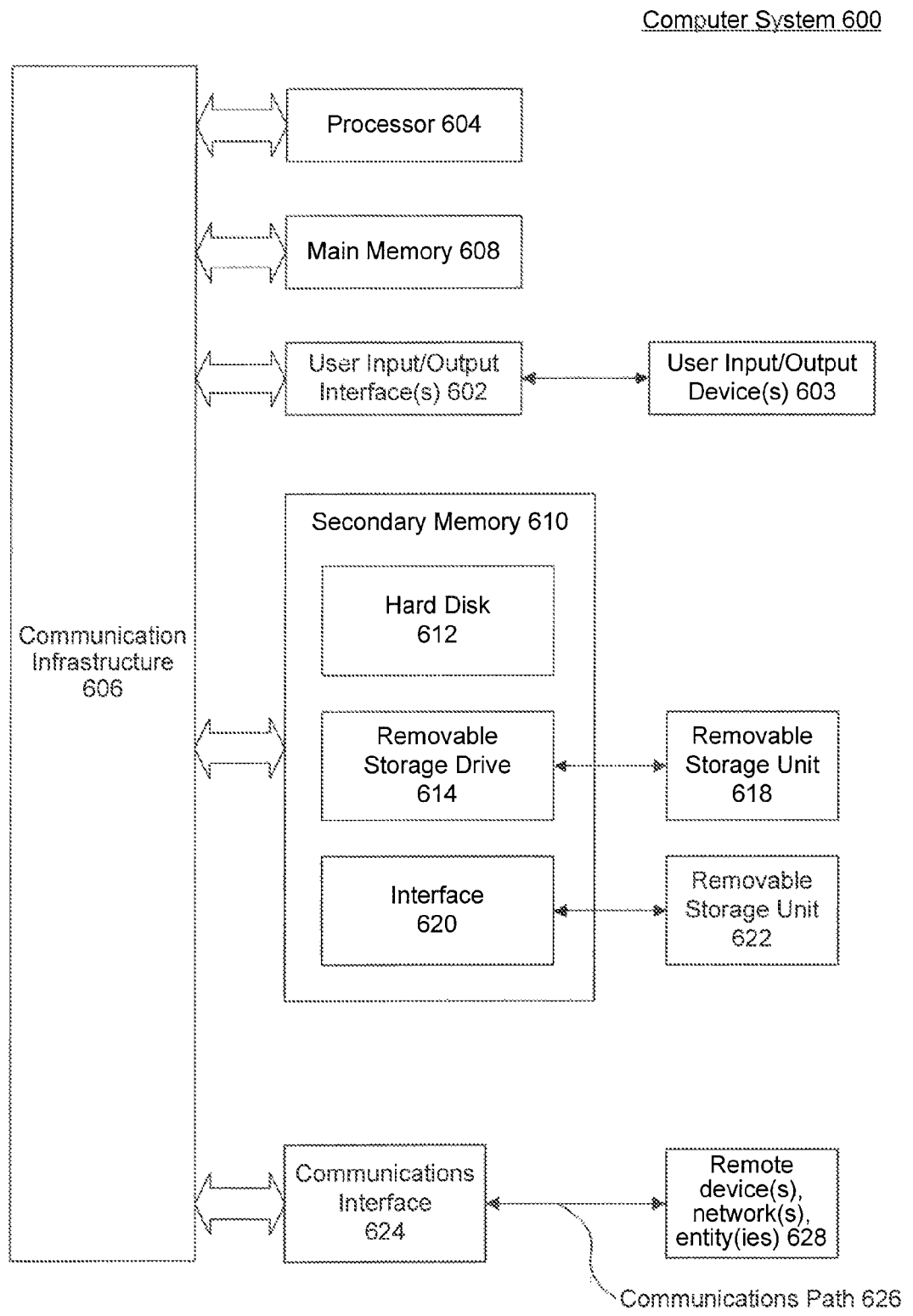
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data.

Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
creating, by at least one processor, a bitmap identifying rows in an in-memory column-store database, the bitmap comprising a list of bit chunks, a bit chunk comprising an offset comprising a natural number indicating a chunk size, and a bit specification comprising one of an ordered row id list, a contiguous row id sequence, and a bit vector;
modifying a row id of the bitmap;
determining a bit specification of a bit chunk in the list of bit chunks;
converting the bit specification of the bit chunk from a first type to a second type to reduce memory used to represent the bitmap, wherein the first type is different than the second type and the conversion is based on the determined bit specification and the modified row id; and
performing database operations using the bitmap on the in-memory column-store database.

2. The method of claim 1, the bitmap further comprising:
a first chunk reference indicating a first bit chunk in the list of bit chunks; and
a last chunk reference indicating a last bit chunk in the list of bit chunks.

3. The method of claim 1, the bit specification further comprising:
a first row id indicating a first bit in the bit specification; and
a last row id indicating a last bit in the bit specification.

4. The method of claim 1, the bit chunk further comprising:
a next chunk reference indicating a next bit chunk in the list of bit chunks; and
a previous chunk reference indicating a previous chunk in the list of bit chunks.

5. The method of claim 1, wherein the modifying comprises:
adding a new row id to the bitmap.

6. The method of claim 1, wherein the modifying comprises:
removing an existing row id from the bitmap.

7. The method of claim 1, wherein the modifying comprises:
appending a new row id to the bitmap by adding the new row id to a last bit chunk in the bitmap.

8. The method of claim 1, the modifying further comprising:
appending a new row id to the bitmap by adding the new row id to a new bit chunk added after a last bit chunk of the bitmap; and
coalescing the new bit chunk and the last bit chunk of the bitmap into a single new last bit chunk.

9. The method of claim 1, wherein the chunk size is divisible by a number of bits in a machine word.

10. The method of claim 1, the database operations comprising insertion of rows, deletion of rows, updating of rows, selection of rows, and determination of rows visible to a transaction.

11. A system, comprising:
a memory; and
at least one processor coupled to the memory and configured to:
create a bitmap identifying rows in an in-memory column-store database, the bitmap comprising a list of bit chunks, a bit chunk comprising an offset comprising a natural number indicating a chunk size, and a bit specification comprising one of an ordered row id list, a contiguous row id sequence, and a bit vector;
modify a row id of the bitmap;
determine a bit specification of a bit chunk in the list of bit chunks;
convert the bit specification of the bit chunk from a first type to a second type to reduce memory used to represent the bitmap, wherein the first type is different than the second type and the conversion is based on the determined bit specification and the modified row id; and
perform database operations using the bitmap on the in-memory column-store database.

12. The system of claim 11, the bitmap further comprising:
a first chunk reference indicating a first bit chunk in the list of bit chunks; and
a last chunk reference indicating a last bit chunk in the list of bit chunks.

13. The system of claim 11, the bit specification further comprising:
a first row id indicating a first bit in the bit specification; and
a last row id indicating a last bit in the bit specification.

14. The system of claim 11, the bit chunk further comprising:
a next chunk reference indicating a next bit chunk in the list of bit chunks; and
a previous chunk reference indicating a previous chunk in the list of bit chunks.

15. The system of claim 11, the at least one processor further configured to:
add a new row id to the bitmap.

16. The system of claim 11, the at least one processor further configured to:
remove an existing row id from the bitmap.

17. The system of claim 11, the at least one processor further configured to:
append a new row id to the bitmap by adding the new row id to a last bit chunk in the bitmap.

18. The system of claim 11, the at least one processor further configured to:
append a new row id to the bitmap by adding the new row id to a new bit chunk added after a last bit chunk of the bitmap; and
coalesce the new bit chunk and the last bit chunk of the bitmap into a single new last bit chunk.

19. The system of claim 11, wherein the chunk size is divisible by a number of bits in a machine word.

20. A tangible computer-readable device having instructions stored thereon that, when executed by at least one computing device, causes the at least one computing device to perform operations comprising:
creating a bitmap identifying rows in an in-memory column-store database, the bitmap comprising a list of bit chunks, a bit chunk comprising an offset comprising a natural number indicating a chunk size, and a bit specification comprising one of an ordered row id list, a contiguous row id sequence, and a bit vector;
modifying a row id of the bitmap;
determining a bit specification of a bit chunk in the list of bit chunks;
converting the bit specification of the bit chunk from a first type to a second type to reduce memory used to represent the bitmap, wherein the first type is different than the second type and the conversion is based on the determined bit specification and the modified row id; and
performing database operations using the bitmap on the in-memory column-store database.

* * * * *